United States Patent
Saarinen et al.

(10) Patent No.: US 10,840,737 B2
(45) Date of Patent: Nov. 17, 2020

(54) SYSTEM AND METHOD FOR STORING HIGH CAPACITY ELECTRIC ENERGY

(71) Applicant: Teraloop Oy, Helsinki (FI)

(72) Inventors: Petri Saarinen, Espoo (FI); Atte Oskari Heikkila, Helsinki (FI)

(73) Assignee: Teraloop OY, Helsinki (FI)

( * ) Notice: Subject to any disclaimer, the term of this patent is extended or adjusted under 35 U.S.C. 154(b) by 783 days.

(21) Appl. No.: 15/323,914

(22) PCT Filed: Jul. 4, 2014

(86) PCT No.: PCT/FI2014/050560
§ 371 (c)(1),
(2) Date: Jan. 4, 2017

(87) PCT Pub. No.: WO2016/001478
PCT Pub. Date: Jan. 7, 2016

(65) Prior Publication Data
US 2017/0149279 A1    May 25, 2017

(51) Int. Cl.
*H02K 7/02* (2006.01)
*H02K 21/12* (2006.01)
(Continued)

(52) U.S. Cl.
CPC ............... *H02J 15/00* (2013.01); *H02J 3/28* (2013.01); *H02K 1/12* (2013.01); *H02K 1/22* (2013.01);
(Continued)

(58) Field of Classification Search
CPC ... H02J 3/28; H02J 15/00; H02K 1/12; H02K 1/22; H02K 3/28; H02K 7/025; H02K 7/09; H02K 21/12; Y02E 60/16; F16F 15/03; F16F 15/173; F16F 15/30; F16F 15/31; F16F 15/315; F16F 15/32; F03G 3/08
See application file for complete search history.

(56) References Cited

U.S. PATENT DOCUMENTS

| 4,486,038 A |   | 12/1984 | Bredenkamp |
| 5,115,219 A | * | 5/1992 | Withers ................ F17C 13/087 |
|   |   |   | 335/216 |

(Continued)

FOREIGN PATENT DOCUMENTS

| CN | 102122860 B |   | 2/2013 |   |
| DE | 2544261 C2 | * | 9/1982 | ............ F16C 32/044 |

(Continued)

*Primary Examiner* — Adam D Rogers
(74) *Attorney, Agent, or Firm* — Fay Sharpe LLP

(57) ABSTRACT

The disclosed embodiments provide a highly efficient, utility scale energy storage and retrieval system. The system is characterized by a chain of multiple rotating interconnected masses (8), a hollow toroid-shaped housing (1), plural pairs of permanent magnets (7, 11), magnets (7, 11) and coils (10) for the charging and discharging of electric energy and is operated by an automated control system. The mass (8) chain is fitted and rotating inside the housing (1), and the energy is stored into the rotational energy of the chain. The transformation of electrical energy into rotational energy or vice versa is carried out by using coil units (10). In order to minimize losses, the chain is magnetically levitating and a vacuum is pumped into the housing (1).

10 Claims, 5 Drawing Sheets

(51) Int. Cl.
*H02K 1/06* (2006.01)
*H02J 15/00* (2006.01)
*H02J 3/28* (2006.01)
*H02K 7/09* (2006.01)
*H02K 1/12* (2006.01)
*H02K 1/22* (2006.01)
*H02K 3/28* (2006.01)

(52) U.S. Cl.
CPC .............. *H02K 3/28* (2013.01); *H02K 7/025* (2013.01); *H02K 7/09* (2013.01); *H02K 21/12* (2013.01); *Y02E 60/16* (2013.01)

(56) References Cited

U.S. PATENT DOCUMENTS

| | | | | |
|---|---|---|---|---|
| 5,130,687 A | * | 7/1992 | Evrard | H01F 6/00 335/216 |
| 5,905,321 A | * | 5/1999 | Clifton | F16C 32/0459 310/113 |
| 8,593,012 B2 | | 11/2013 | Peitzke et al. | |
| 8,742,616 B1 | | 6/2014 | Dehlsen et al. | |
| 8,946,958 B2 | * | 2/2015 | Roberts | F03G 3/08 310/74 |
| 9,359,991 B2 | * | 6/2016 | Davey | F03B 13/264 |
| 2003/0192449 A1 | | 10/2003 | Fiske | |
| 2011/0215592 A1 | | 9/2011 | Ishikawa et al. | |

FOREIGN PATENT DOCUMENTS

| | | | | |
|---|---|---|---|---|
| EP | 0017724 A1 | * | 10/1980 | .............. H02K 7/025 |
| JP | 7327338 A | | 12/1995 | |
| JP | H08107636 A | | 4/1996 | |
| JP | H08116630 A | | 5/1996 | |
| JP | H1097932 A | | 4/1998 | |
| JP | 200060033 A | | 2/2000 | |
| JP | 03471441 B2 | | 12/2003 | |
| WO | 2003049249 A1 | | 6/2003 | |
| WO | 2012155170 A1 | | 5/2011 | |
| WO | 2014094558 A1 | | 6/2014 | |

* cited by examiner

SYSTEM AND METHOD FOR STORING HIGH CAPACITY ELECTRIC ENERGY

BACKGROUND

Field of the Invention

This invention relates essentially to a system for storing high capacity electric energy, and relates particularly but not exclusively to the technical field of electrical grid power storage.

Description of Prior Art

Demand for the electricity in the grid systems around the world varies heavily over the course of the day and from season to season. The power stations need to be scaled up to meet the peak loads of the grid. However, this way the power plants are not running on full power most of the time, which reduces the efficiency of the electricity generation and ties large amounts of capita to the seldom-needed high capacity of the power plants. In addition, the intermittent nature of many renewable power sources, such as solar and wind power, causes further requirements for the stabilization of the grid. Public opinion favors these green options for energy production, but a grid system depending highly on renewable power sources requires a large amount of stabilizing power sources so that the demand of the grid can be met on cloudy and calm days.

While aiming to reduce the carbon emissions and increase the capacity of renewable power sources, many nations have conducted studies about the possibility of utilizing storage systems in industrial scale. The storages could store the excess energy generated on peak solar and wind hours, which could be then used later when the demand in the grid increases. Currently there are a few grid scale electric energy storage systems that store the energy in mechanical energy. The most relevant technologies related to the innovation are contemporary flywheel energy storages and advanced rail energy storage (ARES) technology, e.g. WO2003049249A1 and U.S. Pat. No. 8,593,012B2.

Contemporary flywheel energy storage system consists of a rotor suspended by bearings inside a vacuum chamber to reduce friction, connected to a combination of electric motor and electric generator. Unfortunately, flywheels to date have several significant drawbacks. Current systems do not store enough energy for sufficient and consistent power grid applications. The output powers of the current flywheels are limited to a few tens of MW with the storage capacity of less than ten MWh. Another essential problem is that, the flywheel is connected to and rotates around an axle or shaft, whereas in the disclosed invention the mass is not connected to an axle, which in turn allows for the invention to be easily scaled into much larger dimensions than contemporary flywheels. In addition, current flywheels do not allow for simultaneous input and output of electric energy.

The problem with ARES technology on the other hand is that it uses heavy wagons, equipped with a similar motor-generator as the above-mentioned flywheel that are moved between different elevations. The excess capacity of the grid is used to power the motors and move the wagons to a higher elevation storing the electric energy into potential energy. This procedure is reversed when the grid requires energy. ARES has been reported to be capable of providing powers up to a few GW with the storage capacity of a few tens of GWh. The main problem with the ARES technology and is that ARES requires large areas of sloped territory, whereas the invention at hand can be buried underground and does not need a specific sloped terrain.

Moreover, the current solutions are complex, relatively expensive or require specific conditions. As above stated, the ARES, for example, requires a large slope for the rail system, which limits the deployment locations of the storage system. It is therefore desirable to provide easily scalable energy storage with capability in the power generation range of MW to TW capacity and in the energy storage range of MWh to TWh with high efficiency and reduced installation and capital investment requirements. It is an object of the present invention to provide an improved system for enabling the storage and retrieval of high capacity electric energy on an industrial scale. It is apparent from the foregoing that a technology that would combine kinetic energy storage, magnetic levitation and ring-shaped flywheel inside a toroid-shaped vacuum does not yet exist. The prior art fails even to suggest a solution to the dilemma of utility scale energy storages.

SHORT DESCRIPTION OF THE INVENTION

The object of the invention is to overcome the above-mentioned shortcomings. This is achieved by a system for storing energy for the means, which utilizes said energy storing capacity, characterized in that said system comprising: a hollow essentially toroid-shaped housing which contains an essentially circular-shaped mass, and the system comprising, magnets mounted on said housing and on the mass aligned so that the magnets in the housing oppose the magnets on the mass, coil units, and a connection being arranged between the system and said means, which utilizes the energy storing capacity.

The focus of the invention is also a method for storing energy for the means, which utilizes said energy storing capacity, characterized in that said method comprising: (i) capturing electric energy, in a mass which is rotating within a housing, produced by an energy source until an energy level of said energy storage system is at a maximum threshold; (ii) using electric energy to accelerate the mass and storing said electric energy in mechanical energy; (iii) decelerating the mass and delivering electricity back out of the system.

The invention is based on that electrical energy is stored in form of mechanical energy, by rotating a magnetically levitating interconnected mass within a hollow toroid-shaped housing. The invention is further based on capturing, in an energy storage system, energy produced by an energy source until an energy level of said energy storage system is at a maximum threshold.

Advantageous Effects of Invention

The invention at hand has several advantages over the current flywheel and ARES technologies. One benefit of the invention is that the energy storage capacity of the system can be increased by making the diameter of the toroid larger or increasing the weight of the interconnected masses. This way the system is easily scalable and has energy storage potential up to several TWh. For example, for a power storage system with a TWh energy capacity, the radius of the storage system would be approximately 2.5 km. Furthermore, each mass would weight approximately 30-40 tons, adding up to a total mass of approximately 70,000 tons for the chain of interconnected masses. Further benefits of the invention are that the system can be hidden away underground, so it requires only minimal surface area and it allows for minimal structural alterations to the surrounding. Other advantages are that the system generates minimal noise, and it is environmentally friendly. Thanks to these advantages, the electricity storage system is expected to be used e.g. in combination with electrical grid scale power generators also in urban areas as a next-generation electricity storage means.

DETAILED DESCRIPTION OF PREFERRED EMBODIMENTS

The following description is not intended to limit the scope or applicability of the invention in any way. Rather, the following description is intended to provide convenient illustrations for implementing various embodiments of the invention. As will become apparent, various changes can be made to the methods, structures, devices, systems, components, and compositions described in these embodiments without departing from the spirit and scope of the invention.

Figure 3:
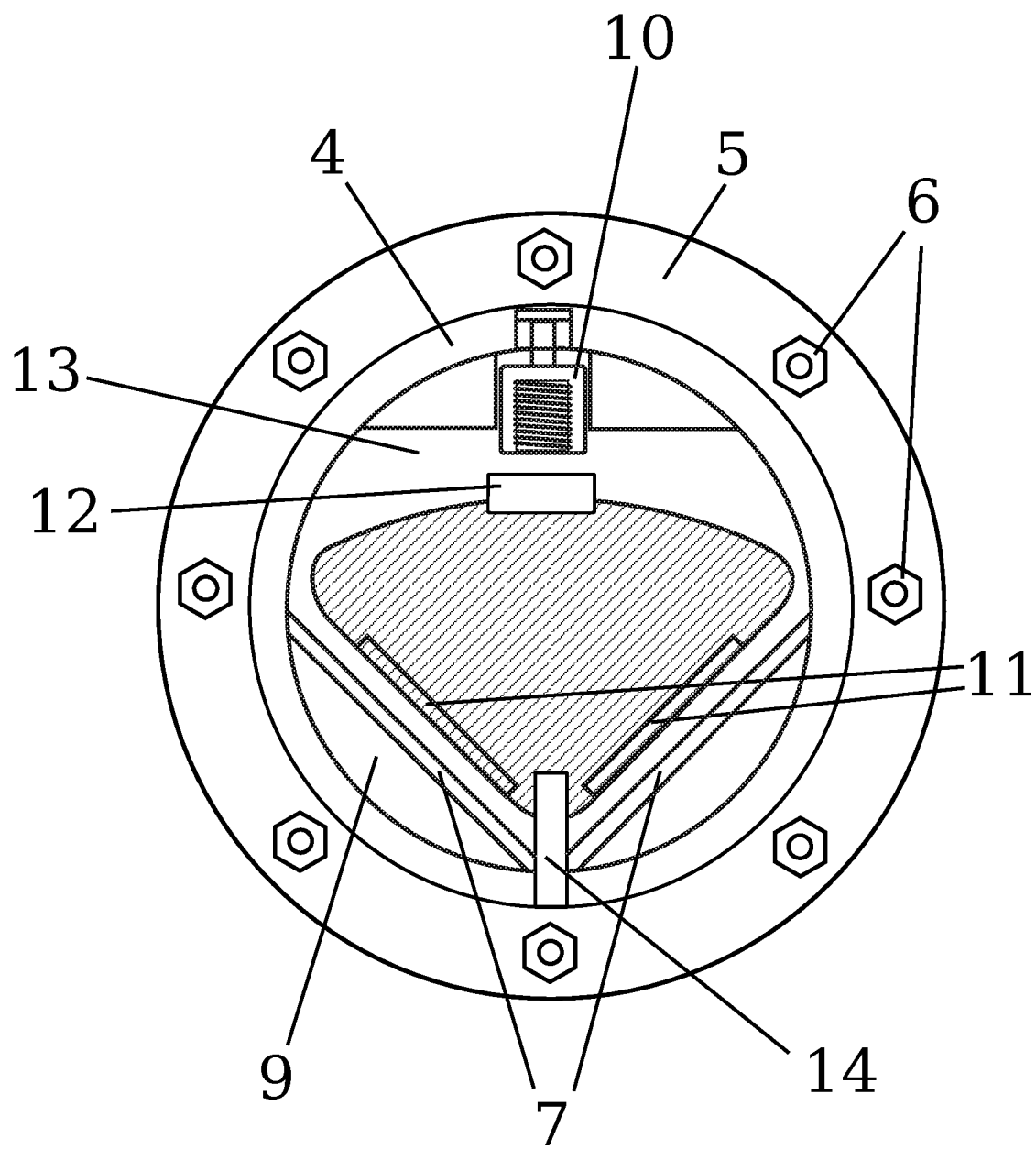
FIG. 3 shows an exemplary vertical cross-sectional view of the system, with outer wall, collar, bolts, levitation magnets of the housing, support structure of the levitation magnets, adjustable coil unit, heavy mass wagon, levitation magnets of the mass, current inducing magnets, vacuum interior and locking mechanism.

Turning to the drawings wherein like reference characters designate identical or corresponding parts, and more particularly, with reference to FIG. 3, the system comprises a hollow essentially toroid-shaped housing 1 which contains an essentially circular-shaped mass 8, and the system comprising, magnets mounted on said housing and on the mass aligned so that the magnets 7 in the housing oppose the magnets 11 on the mass, a coil units 10, and a connection being arranged between the system and said means, which utilizes the energy storing capacity. The term "means" as used within this disclosure refers to any means of energy consumption by a process or system. In one embodiment, a means for utilizing the energy storing capacity could be a utility scale grid. The system could be located in different places, e.g. buried inside, build on top of the ground or alternatively placed under water.

In other words, the electric energy is stored in the form of rotational energy. This can be performed e.g. in that the electric energy is stored and released through accelerating and decelerating a mass. In other words energy is stored by accelerating the mass and the mass is accelerated by supplying electricity from an electrical source. The electricity can be supplied via a connection between the electrical source and the energy storage system. For the purposes of this invention an energy source may be a renewable energy source, such as a wind turbine or a solar panel providing a relatively variable power supply, or a nonrenewable energy source. Whereas energy is drawn from the system by slowing the mass down and converting the kinetic energy back to electric energy.

For the purposes of this invention a mass could be a solid body fitted with magnets 7 and 11 for levitation and magnets 12 for power generation and storage. Particularly, said mass 8 could be made out of for example concrete or any other rigid material to establish a sufficiently heavy mass. Similarly, said mass could be made out of any combination of different materials. The levitation of the mass could be achieved by using the repulsive force between the magnets fitted on the housing and the magnets fitted on the mass, as depicted by FIG. 3. The mass could be preferably of the shape illustrated in FIGS. 3, 4 and 5, however this embodiment does not exclude any other possible shapes.

Figure 4:
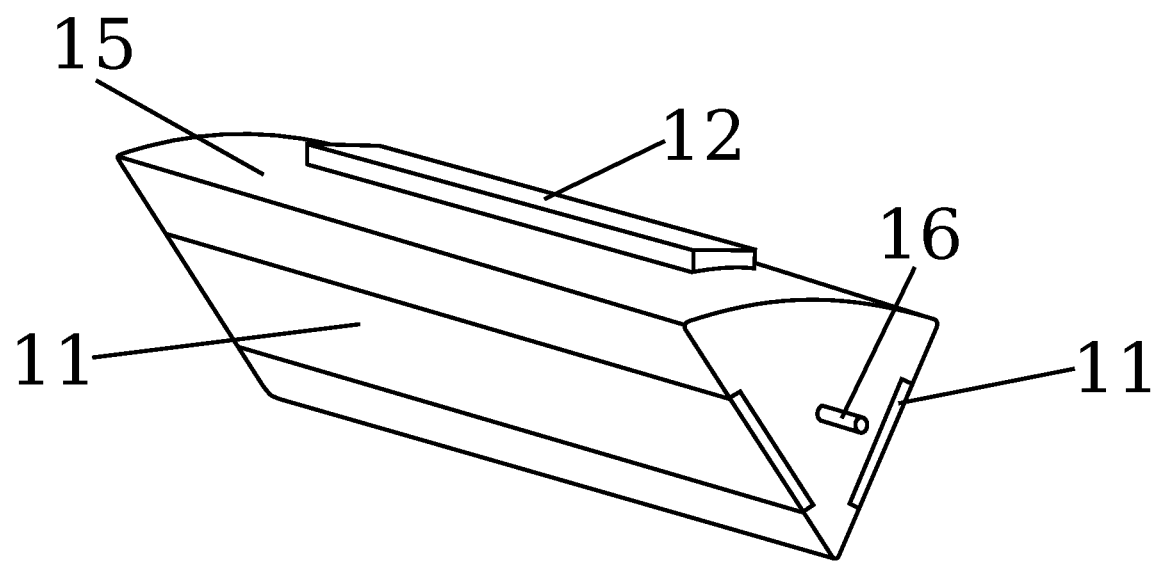
FIG. 4 shows an exemplary scheme of a mass, with body of a mass, levitation permanent magnets of a mass, current inducing magnets and coupling/joint.
Figure 5:
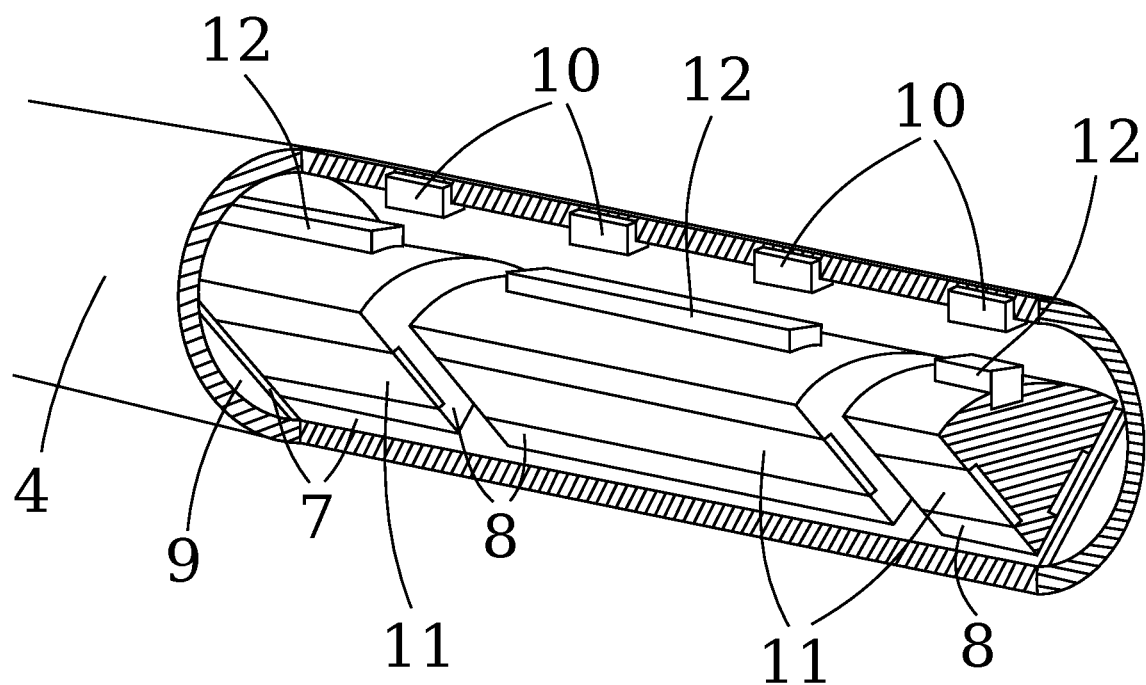
FIG. 5 shows an exemplary scheme of the system with interconnected chain of heavy mass wagons, with the housing outer wall, levitation magnets of the housing, mass, support structure of the levitation magnets, adjustable coil units, levitation magnets of the mass and current inducing magnets.

In one embodiment, as shown in FIG. 5, a first mass can be connected to a second mass or a plurality of masses to form a interconnected continuous chain, however so that at least one continuous mass is rotating within the housing 1. Connecting multiple masses can be achieved by using for example couplings 16 that are fitted to each mass, as illustrated in FIG. 4. The couplings 16 could be arranged in a plethora of ways and could consist of a multitude of materials. The chain can be thought of as a ring-like flywheel, i.e. without the need of being connected to an axle. The system is not bound to any particular shape or size, as more specifically explained in the subsequent paragraphs.

In one embodiment for a power storage system with a TWh energy capacity, the radius of the housing could be approximately 2.5 km. Furthermore, each mass could weight approximately 30-40 tons with the outer dimensions of 1.5 m×2 m×8 m (height×width×length). This would add up to a total mass of approximately 70,000 tons for the chain of heavy masses. A heavy mass and a large radius of the housing are important since the energy storage capacity of the system depends on both of these quantities. This can be seen in the following two equations. The energy in a rotational motion is described by the following equation (Eq. 1), $$E = \frac{1}{2}I\omega^2, \qquad (\text{Eq. 1})$$

in which E is the rotational energy, I is the moment of inertia of the moving mass and ω is the angular velocity of the mass. The dependence of the mass and the dimensions can be seen from the equation for the moment of inertia (Eq. 2), $$I = m\left(R^2 + \frac{3}{4}r^2\right) \qquad (\text{Eq. 2})$$

in which I is the moment of inertia of a torus-shaped mass, R is the radius of the torus, r is the cross-sectional radius of the torus and m is the mass of the torus.

Figure 1:
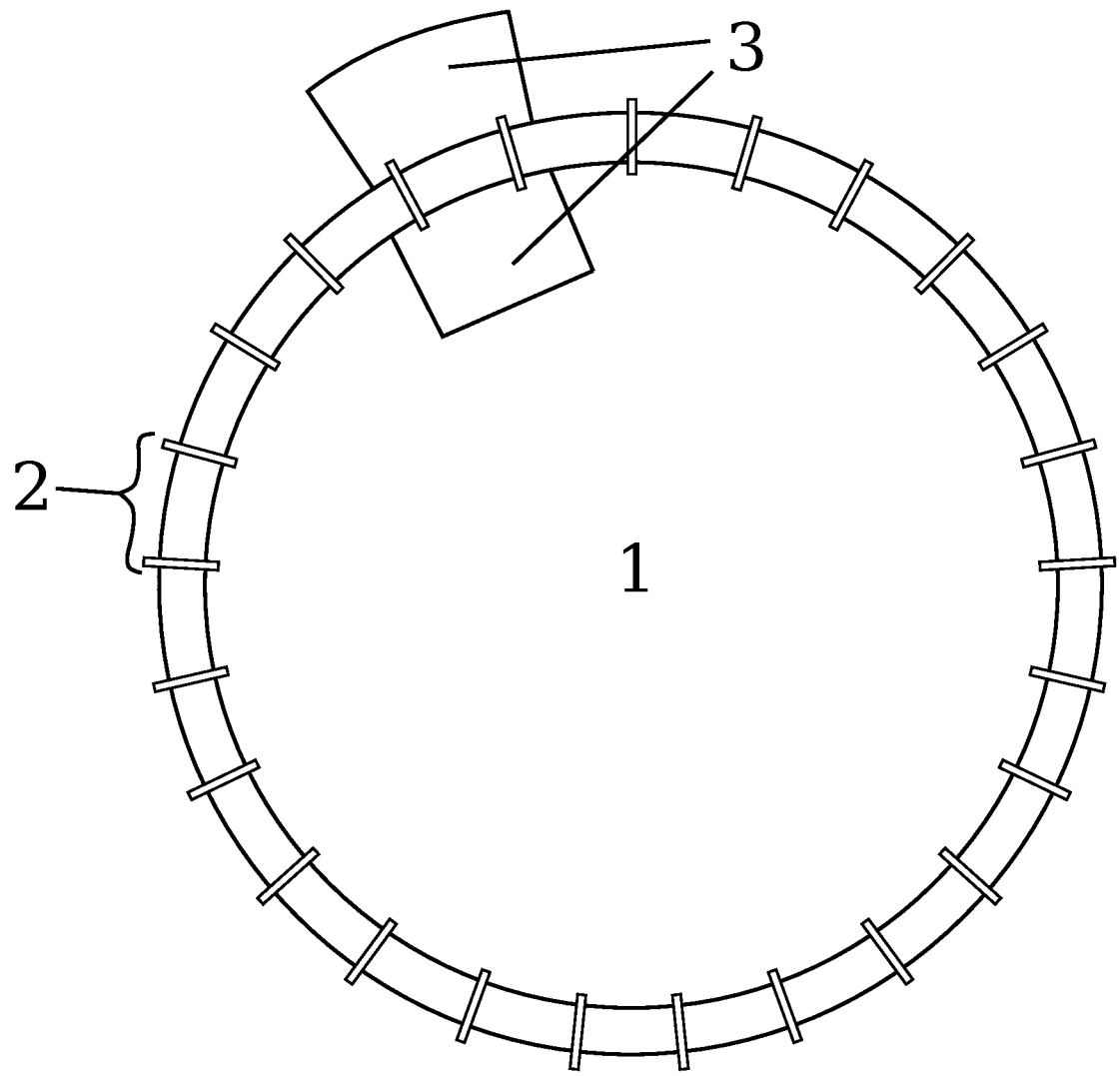
FIG. 1 shows a top view of an exemplary toroid-shaped housing of the system, which consists of housing modules and service space for maintenance purposes.
Figure 2:
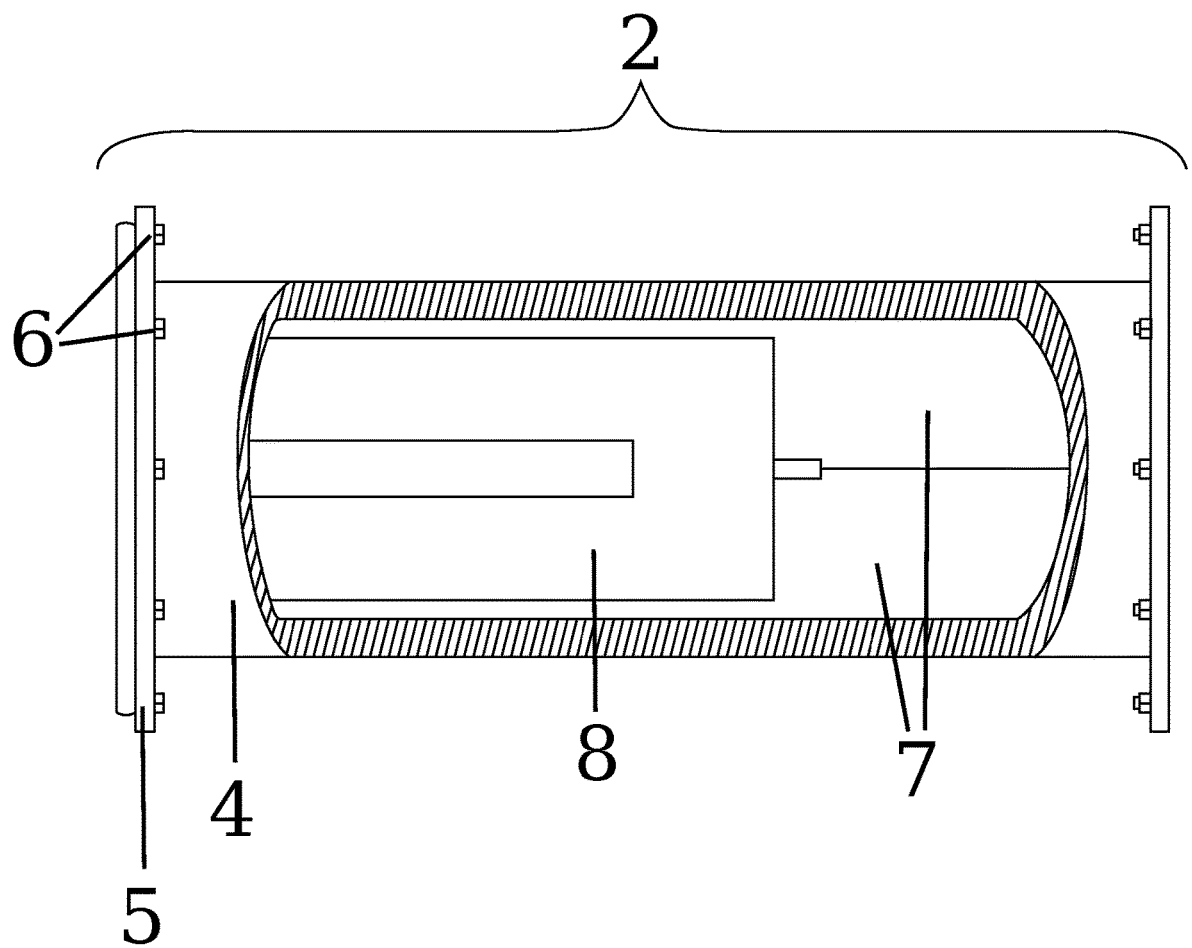
FIG. 2 shows a horizontal cross-sectional view of an exemplary housing module, with outer wall, collar, bolts, levitation magnets of the housing and mass.

As seen in FIGS. 2, 3 and 5, a chain of masses is fitted in a vacuum hollow toroid-shaped housing 1. A housing 1 could consist solely of concrete and steel permanent magnets, however other arrangements could be possible. A toroid-shaped housing 1 could be formed by preferably fitting together multiple housing modules 2 with fasteners. In one embodiment the housing modules may be connected with collars 5 and bolts 6 as is seen in FIG. 2 however other ways to connect the housing modules are not excluded, such as welding or clamps. By using sealing rings between the housing modules 2, it is possible to effectively pump a vacuum 13 into the housing and it also allows for the adjustment of the curvature of the housing 1. Alternatively, the housing 1 could be constructed on site from raw materials and does not necessarily have to be formed out of multiple modules. In either case the housing 1 may be fabricated out of concrete and steel or similar rigid materials. The toroid-shaped housing may be fitted with multiple maintenance spaces 3 in which the masses 8 can be serviced as seen in FIG. 1.

FIG. 3 shows an exemplary vertical cross-sectional view of the system, where both the masses 8 and the housing 1 are fitted with permanent magnets 7 and 11 in order to magnetically levitate the mass chain. By removing the need for contact with the surface via for example wheels and pumping a vacuum inside the housing 1, friction is substantially reduced and the speed of the masses 8 can be increased more efficiently and additionally the wearing of the materials is minimized, this can be performed by fitting permanent magnets 7 and 11 in the interior of the housing 1 with mounts 9. In other embodiments, levitation may be achieved by fitting the magnets on the outside of the housing or alternatively imbedding them into the housing modules or any combination of the above stated.

In addition to the levitation the magnets 7 and 11 also provide a stabilizing force for the path of the masses. One way to accomplish this is by installing the magnets 7 and 11 in a triangular geometry presented in FIG. 3, however other geometries can come into question. Regardless of geometry, the levitation effect is accomplished by aligning the poles of the levitation magnets 7 in the housing to oppose the levitation magnets 11 on the masses. As further shown in FIG. 1, the housing 1 generates an angular guide to the mass 8 and enables the angular motion of the mass 8. The locking mechanism 14 as shown in FIG. 3 may be fitted to each housing module 2 to keep the mass chain in place for example during periods of maintenance.

Each mass 8 can be fitted with current inducing magnets 12 in order to transform electric energy into rotational energy and vice versa, this is achieved by e.g. interaction with the coil units 10 fitted to the housing 1. FIG. 5 illustrates that the transformation between electric and rotational energy is achieved by e.g. coils that can be arranged in two groups: the charging coils and the discharging coils. In the case of excess capacity in the electrical grid, an electric current from the grid is applied to the charging coils. The current in the coils 10 creates a magnetic field, which repulses the magnets 12 in the masses and accelerates the masses. This way the rotational speed of the mass chain increases and the energy is stored into the rotational energy of the chain. When the electrical grid requires energy the process is reversed to meet the periods of high demand. Now the magnets 12 in the masses induce a current in the discharging coils, resulting in the deceleration of the masses 8 and energy being delivered out of the system.

In one embodiment the height of the coils 10 can be adjusted in order to minimize losses and to enable adjustment of the output current. The possible separation of the coils 10 into two different groups allows simultaneous charging and discharging. The system provides for a continuous circulation of masses allowing for consistent power storage and retrieval. This characteristic enables efficient electric energy storage.

The input and output of energy in the storage system can be operated by adjusting the heights of the coil units 10. This could be the case whether the coils 10 are connected to the grid or not. The frequency of the output current can be adjusted by switching the individual discharging coils on and off in order to result in a desired total output current. In one embodiment the control system can be designed so that it automatically responds to the changes in the electric grid.

It is expressly intended that these embodiments, modifications and variations and the equivalents thereof, are to be considered within the spirit and scope of the invention as defined in the following claims, wherein we claim:

1. A system for storing energy comprising: a hollow toroidally-shaped housing which contains a circular-shaped mass comprising a plurality of masses forming an interconnected continuous chain, wherein a first mass of the plurality of masses is connectable to a second mass of the plurality of masses or multiple masses of the plurality masses to form the interconnected chain using couplings fitted to each mass of the plurality of masses, and including magnets mounted on said housing and on the circular-shaped mass, the magnets being aligned so that the magnets in the housing oppose the magnets on the circular-shaped mass, coil units and a connection for delivery the stored energy.

2. A system of claim 1, wherein the system enables simultaneous input and output of electrical energy.

3. A system according to claim 2, wherein the circular-shaped mass is levitated in a vacuum within the toroidally-shaped housing by a repulsive force between the magnets in the housing and the magnets on the circular-shaped mass.

4. A system according to claim 3, wherein said toroidally-shaped housing is formed by multiple housing modules which are connected together with fasteners.

5. A system according to claim 2, wherein the toroidally-shaped housing generates an angular guide to the circular-shaped mass and enables an angular motion of the circular-shaped mass.

6. A system according to claim 1, wherein the circular-shaped mass is levitated in a vacuum within the toroidally-shaped housing by a repulsive force between the magnets in the toroidally-shaped housing and the magnets on the circular-shaped mass.

7. A system according to claim 6, wherein the toroidally-shaped generates an angular guide to the circular-shaped mass and enables an angular motion of the circular-shaped mass.

8. A system according to claim 7, wherein said toroidally-shaped housing is formed by multiple housing modules which are connected together with fasteners.

9. A system according to claim 1, wherein the toroidally-shaped housing generates an angular guide to the circular-shaped mass and enables an angular motion of the circular-shaped mass.

10. A system according to claim 1, wherein said toroidally-shaped housing is formed by multiple housing modules which are connected together with fasteners.

* * * * *